US012651500B2

(12) United States Patent
Pandiyan et al.

(10) Patent No.: US 12,651,500 B2
(45) Date of Patent: Jun. 9, 2026

(54) METHOD AND SYSTEM FOR CONTROLLING BUILDING ACCESS USING A MOBILE DEVICE

(71) Applicant: Honeywell International Inc., Charlotte, NC (US)

(72) Inventors: S.B. Saravana Pandiyan, Tamil Nadu (IN); Vikramraj Sivaram, Tamil Nadu (IN); Thiruppathi V, Tamil Nadu (IN); Chithira P S Menon, Tamil Nadu (IN); Prithivirajan Sadhasivam, Tamil Nadu (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 162 days.

(21) Appl. No.: 18/598,880

(22) Filed: Mar. 7, 2024

(65) Prior Publication Data

US 2025/0285484 A1 Sep. 11, 2025

(51) Int. Cl.

*G07C 9/28* (2020.01)
*G07C 9/00* (2020.01)
*G07C 9/27* (2020.01)

(52) U.S. Cl.

CPC ........... *G07C 9/28* (2020.01); *G07C 9/00309* (2013.01); *G07C 9/00571* (2013.01); *G07C 9/27* (2020.01); *G07C 2209/63* (2013.01)

(58) Field of Classification Search

CPC ... G07C 9/28; G07C 9/00309; G07C 9/00571
See application file for complete search history.

(56) References Cited

U.S. PATENT DOCUMENTS 4,672,654 A 6/1987 Vanacore
5,187,688 A * 2/1993 Saruta .................... G01S 15/50 367/99
5,640,139 A 6/1997 Egeberg
(Continued)

FOREIGN PATENT DOCUMENTS

AU 2014236999 A1 10/2015
CA 2640261 A1 8/2007
(Continued)

OTHER PUBLICATIONS

Mobile Credential End-User Flyer, 3x Logic, Westminster, CO, 2 pages, 2018.
(Continued)

*Primary Examiner* — Nabil H Syed
(74) *Attorney, Agent, or Firm* — Seager, Tufte & Wickhem, LLP

(57) ABSTRACT

A mobile device is used as an access control device to gain access to a secure area of a facility. One or more wireless access points receives and an International Mobile Equipment Identity (IMEI)-based identifier that is unique to the user's mobile device, and identifies a currently location of the user's mobile device. The door is electrically unlocked when the current location of the user's mobile device is determined to be within a predetermined proximity to the door and the received IMEI based identifier of the user's mobile device is associated with a user that has access rights to access through the door. Various techniques are employed to detect possible tailgating events.

19 Claims, 11 Drawing Sheets

(56) References Cited

U.S. PATENT DOCUMENTS 6,384,709 B2 5/2002 Mellen et al.
7,012,503 B2 3/2006 Nielsen
7,969,302 B2 6/2011 Srinivasa et al.
8,560,839 B2 10/2013 Barham et al.
8,593,249 B2 11/2013 Bliding et al.
8,792,936 B2 7/2014 Rajendran et al.
8,793,776 B1 7/2014 Jackson
8,839,361 B2 9/2014 R
8,943,187 B1 1/2015 Saylor
9,058,702 B2 6/2015 Chao et al.
9,076,273 B2 7/2015 Smith et al.
9,098,688 B1 8/2015 Jackson
9,118,656 B2 8/2015 Ting et al.
9,292,985 B2 3/2016 Ahearn et al.
9,305,298 B2 4/2016 Wilson
9,322,194 B2 4/2016 Cheng et al.
9,322,201 B1 4/2016 Cheng et al.
9,367,676 B2 6/2016 Wilson
9,382,739 B1 7/2016 Johnson et al.
9,396,320 B2 7/2016 Lindemann
9,444,805 B1 9/2016 Saylor et al.
9,470,017 B1 10/2016 Cheng et al.
9,470,018 B1 10/2016 Cheng et al.
9,472,034 B2 10/2016 Ahearn et al.
9,508,206 B2 11/2016 Ahearn et al.
9,514,469 B2 12/2016 Fuchs et al.
9,530,295 B2 12/2016 Johnson
9,589,403 B2 3/2017 Lingan et al.
9,600,949 B2 3/2017 Conrad et al.
9,697,656 B2 7/2017 Trani
9,713,002 B2 7/2017 Roy et al.
9,767,632 B2 9/2017 Johnson
9,887,983 B2 2/2018 Lindemann et al.
9,898,881 B2 2/2018 Ives-Halperin et al.
10,096,182 B2 10/2018 Prasad et al.
10,176,310 B2 1/2019 Baghdasaryan
10,182,309 B2 1/2019 Mahasenan et al.
10,186,098 B2 1/2019 Lingan et al.
10,186,099 B2 1/2019 Ahearn et al.
10,198,884 B2 2/2019 Johnson
10,268,811 B2 4/2019 Baghdasaryan
10,270,748 B2 4/2019 Briceno et al.
10,304,273 B2 5/2019 Johnson et al.
10,325,428 B1 * 6/2019 Kurian ............... G07C 9/00571
10,366,218 B2 7/2019 Blanke
10,395,452 B2 8/2019 Morrison et al.
10,594,983 B2 3/2020 Dannan et al.
10,878,650 B1 12/2020 Meruva et al.
11,096,022 B2 8/2021 Billau et al.
11,348,396 B2 5/2022 Meruva et al.
11,363,459 B2 6/2022 Pazhyannur et al.
11,798,340 B1 10/2023 Xu
2003/0179073 A1 9/2003 Ghazarian
2004/0017929 A1 1/2004 Bramblet et al.
2005/0242957 A1 11/2005 Lindsay et al.
2007/0186106 A1 8/2007 Ting et al.
2008/0084473 A1 4/2008 Romanowich
2009/0249433 A1 10/2009 Misra et al.
2010/0102993 A1 4/2010 Johnson
2010/0201536 A1 8/2010 Robertson et al.
2011/0291798 A1 12/2011 Schibuk
2012/0092127 A1 4/2012 Ganapathi et al.
2012/0159156 A1 6/2012 Barham et al.
2012/0169461 A1 7/2012 Dubois, Jr.
2012/0230489 A1 9/2012 Cho
2012/0234058 A1 9/2012 Neil et al.
2013/0021145 A1 1/2013 Boudy
2013/0214898 A1 8/2013 Pineau et al.
2013/0247117 A1 9/2013 Yamada et al.
2013/0257589 A1 10/2013 Mohiuddin et al.
2013/0268998 A1 10/2013 Ko et al.
2013/0311373 A1 11/2013 Han et al.
2013/0314210 A1 11/2013 Schoner et al.
2013/0332367 A1 12/2013 Quigley et al.
2014/0049361 A1 2/2014 Ahearn et al.
2014/0084059 A1 3/2014 Sierchio et al.
2014/0089178 A1 3/2014 Lee et al.
2014/0159660 A1 6/2014 Klose et al.
2014/0189880 A1 7/2014 Funk et al.
2014/0277935 A1 9/2014 Daman et al.
2014/0289116 A1 9/2014 Polivanyi
2014/0289117 A1 9/2014 Baghdasaryan
2014/0289790 A1 9/2014 Wilson
2014/0289820 A1 9/2014 Lindemann et al.
2014/0289833 A1 9/2014 Briceno et al.
2014/0342667 A1 11/2014 Aarnio
2014/0375421 A1 12/2014 Morrison et al.
2015/0194000 A1 7/2015 Schoenfelder et al.
2015/0221151 A1 * 8/2015 Bacco ................... H04L 9/3231
340/5.83
2015/0227969 A1 8/2015 Hanly
2016/0049025 A1 2/2016 Johnson
2016/0173827 A1 6/2016 Dannan et al.
2016/0189454 A1 6/2016 Johnson et al.
2016/0319571 A1 11/2016 Johnson
2016/0335819 A1 11/2016 Lingan et al.
2016/0337508 A1 11/2016 Roy et al.
2017/0018130 A1 1/2017 Robinson
2017/0076523 A1 3/2017 Rumble et al.
2017/0127372 A1 5/2017 Patel et al.
2017/0154483 A1 * 6/2017 Cordiner ................. H04W 4/30
2017/0221291 A1 8/2017 Gokcebay
2017/0270732 A1 9/2017 Troesch et al.
2017/0280322 A1 9/2017 Roy et al.
2017/0289753 A1 10/2017 Mahasenan et al.
2018/0068503 A1 3/2018 Prasad et al.
2018/0068507 A1 3/2018 Prasad et al.
2018/0144568 A1 5/2018 Lingan et al.
2018/0234410 A1 8/2018 Lindemann et al.
2018/0247038 A1 8/2018 Lindemann
2018/0268675 A1 9/2018 Johnson et al.
2019/0019364 A9 1/2019 Cheng et al.
2019/0104133 A1 4/2019 Markel et al.
2019/0130686 A1 5/2019 Cheng et al.
2019/0130687 A1 5/2019 Johnson
2019/0147676 A1 5/2019 Madzhunkov et al.
2019/0253404 A1 8/2019 Briceno et al.
2019/0268736 A1 * 8/2019 Billau ..................... H04W 4/33
2019/0289463 A1 * 9/2019 Glouche ................. G06F 21/43
2020/0051349 A1 * 2/2020 Campbell ............. H04L 63/105
2020/0098216 A1 3/2020 Kuster et al.
2020/0168017 A1 * 5/2020 Prostko ................. G01S 13/886
2020/0351661 A1 11/2020 Kuenzi et al.
2020/0394856 A1 12/2020 Meruva et al.
2021/0034671 A1 2/2021 Lemay et al.
2021/0074101 A1 3/2021 Pertz et al.
2021/0082271 A1 * 3/2021 Mars ....................... H04W 4/80
2021/0158637 A1 * 5/2021 Kincaid ................... G07C 9/28
2021/0166514 A1 6/2021 Boyes et al.
2021/0279988 A1 9/2021 Prasad et al.
2021/0295625 A1 9/2021 Ljung et al.
2021/0335071 A1 10/2021 Nam
2021/0358244 A1 11/2021 Chafni et al.
2021/0390812 A1 12/2021 Salgar et al.
2022/0270424 A1 8/2022 Meruva et al.
2022/0277605 A1 9/2022 Coniff et al.
2022/0384949 A1 12/2022 Pirch
2023/0106865 A1 4/2023 Domova et al.
2023/0107590 A1 * 4/2023 Kreiner .................... G07C 9/23
345/633
2025/0061759 A1 * 2/2025 Pasma ................ G07C 9/00571

FOREIGN PATENT DOCUMENTS

CA 2654838 A1 8/2009
CA 2840665 A1 8/2014
CA 2905009 A1 9/2014
CH 699096 A2 1/2010
CN 102609662 B 7/2012
CN 104144497 A 11/2014
CN 206557866 U 10/2017
CN 103685218 B 9/2018
CN 109272615 A 1/2019
CN 103971039 B 3/2020

(56) References Cited

FOREIGN PATENT DOCUMENTS

| | | | |
|---|---|---|---|
| CN | 105229596 | B | 4/2020 |
| CN | 111885423 | A | 11/2020 |
| CN | 112211502 | A | 1/2021 |
| CN | 112562156 | A | 3/2021 |
| CN | 213690891 | U | 7/2021 |
| DE | 102014106364 | A1 | 11/2014 |
| DE | 102014119003 | A1 | 6/2016 |
| EP | 0265270 | A2 | 4/1988 |
| EP | 1982288 | A2 | 10/2008 |
| EP | 2085934 | A1 | 8/2009 |
| EP | 2106106 | A1 | 9/2009 |
| EP | 2192560 | A1 | 6/2010 |
| EP | 2709334 | A2 | 3/2014 |
| EP | 2763106 | A2 | 8/2014 |
| EP | 2976706 | A2 | 1/2016 |
| EP | 3048587 | A1 | 7/2016 |
| EP | 3603037 | B1 | 11/2021 |
| ES | 2700361 | T3 | 2/2019 |
| GB | 2608692 | A | 1/2023 |
| IN | 2014CH00324 | A | 4/2015 |
| JP | 2014503909 | A | 2/2014 |
| JP | 6433978 | B2 | 12/2018 |
| JP | 2019061688 | A | 4/2019 |
| KR | 20060011267 | A | 2/2006 |
| KR | 101889577 | B1 | 8/2018 |
| KR | 102193740 | B1 | 12/2020 |
| RU | 2672307 | C2 | 11/2018 |
| TW | I513266 | B | 12/2015 |
| WO | 2004112379 | A1 | 12/2004 |
| WO | 2006136662 | A1 | 12/2006 |
| WO | 2007089503 | A2 | 8/2007 |
| WO | 2010003898 | A1 | 1/2010 |
| WO | 201287853 | A2 | 6/2012 |
| WO | 2014151692 | A2 | 9/2014 |
| WO | 2014153462 | A2 | 9/2014 |

OTHER PUBLICATIONS

Cappos et al; "BlurSense: Dynamic Fine-Grained Access Control for Smart Phone Privacy," 2014 IEEE Sensors Applications Symposium (SAS), 4 pages, 2014.
Kupper et al; "TraX: A Device-Centric Middleware Framework for Location Based Services," IEEE Communications Magazine, pp. 114-120, Sep. 2006.
Liu et al; "Double-Windows-Based Motion Recognition in Multi-Floor Buildings Assisted by a Built-in Barometer," Sensors, 2018, 18, 1061, pp. 1-23, Mar. 2018.
Location Based Tracker-Future Lab-ASSA ABLOY-Studying Security Trends. 2 pages, https: //futurelab.assaabloy.com/en/location-based-tracker/ accessed Mar. 1, 2021.
Shuster et al; "Situational Access Control in the Internet of Things," In 2018 SIGSAC Conference on Computer Communication Security (CCS' 18), Toronto, Ontario, Canada, 18 pages, Oct. 15-19, 2018.
Smart Keys, Locks and Door Openers as Part of Intelligent Access Control Systems, Conrad Connect, 2021. https://conradconnect.com/en/blog/smart-keys-locks-and-door-openers-part-intelligent-access-control-systems 16 pages, accessed Mar. 1, 2021.
Tarameshloo et al; "Access Control Models for Geo-Social Computing Systems," SACMAT' 14, London, Ontario, Canada, 12 pages, Jun. 25-27, 2014.
Zhang et al; "Location-Based Authentication and Authorization using Smart Phones," 2012 IEEE 11th International Conference on Trust, Security and Privacy in Computing and Communications, 8 pages, 2012.
Extended European Search Report, European Patent Office, EP Application No. 22156072.5, dated Jul. 21, 2022 (10 pages).
https://www.merriam-webster.com/dictionary/track 2 pages, accessed Apr. 7, 2017.
https://youtube/D1L3088GKew, Lockitron—Keyless Entry Using Your Phone, Lockitron, 3 pages, Oct. 2, 2012. Accessed Mar. 19, 2018.
International Search Report for Corresponding Application No. EP14173062 dated Dec. 5, 2014.
MicroStrategy, "Secure Business Intelligence on Apple® Mobile Devices," Microstrategy Incorporated, 20 pages, COLL-09670511, 2011.
Khan et al., "Location Awareness in 5G Networks using RSS Measurements for Public Safety Applications," IEEE Access, vol. 5, pp. 21753-21762, 2017.
Qiu, "Study on Security and Privacy in 5G-Enabled Applications," Wireless Communications and Mobile Computing, vol. 2020, 15 pages, 2020.
Usher, "Safe and Secure Mobile Identity Network," Micro-Strategy Incorporated, 2 pages, COLL-1085 1012, 2013.
Wikipedia, International Mobile Equipment Identity, 7 pages, Accessed Aug. 24, 2023.
Fave et al., "Game-theoretic Security Patrolling with Dynamic Execution Uncertainty and a Case Study on a Real Transit System," Journal of Artificial Intelligence Research vol. 50, pp. 321-367, Jun. 2014.
"Logosoft brings lone worker supervision into the Android era," http://www.securitynewsdesk.com/lo go soft-brings-lone-worke••supervision-android-era/, 7 pages, May 29, 2014.
Sookman, "Smartphones are Key to the Future of Security," https://www.guardly.com/blog /2015 /0 2/04/smartphones-are-key-to-the•future-of-security/index.html, 5 pages, Feb. 4, 2015.
Bobescu et al., "Mobile indoor positioning using wi-fi localization," Review of the Air Force Academy, No. 1 (28), 4 pages, 2015.
Bhargava et al., "Physical Authentication through Localization in Wireless Local Area Networks," Global Telecommunications Co••ference, Globecom '05 IEEE, 5 pages Jan. 23, 2006.
"Passive Entry Door System with Proximity Sensor," http://www.atmel.corn/Images/ Atmel-425 82-Passive-Entry-Door-System-with•Proximity-Sensor_Application%20N ote _AT 12649. pdf, 22 pages, Nov. 2015.
Bellido-Outeirno, "Universal Bluetooth Access Control and Sec••rity System," International Journal on Advances in Security, vol. 4 No. 3 and 4, 10 pages, 2011.
"Mobile Access Control: the Ultimate Guide," KISI, 10 pages, accessed Jun. 17, 2019.
Wikipedia, "ONVIF," 4 pages, 2022, Accessed Jan. 12, 2022.
ONVIF™, "Analytics Service Specification" Version 21.12, 77 pages, Dec. 2021.
ONVIF™, "Streaming Specification" Version 21.12, 36 pages, Dec. 2021.
Yang et al., "Cooperative Data Deployment Scheme for Better Context Inference in Wide Area Surveillance Environment," International Journal of Information and Education Technology, vol. 2, No. 2, 5 pages, Apr. 2012.
Extended European Search Report, EP Application No. 23194257.4, European Patent Office, Feb. 13, 2021 (8 Pages).
Alghushairy, et al., "A Review of Local Outlier Factor Algorithms for Outlier Detection in Big Data Streams," Big Data and Cognitive Computing, 24 pages, Published Dec. 29, 2020.
Deepty et al., "IoT and Wi-Fi Based Door Access Control System using Mobile Application," 2019 IEEE International Conference on Robots, Automation, Artificial-Intelligence and Internet of Things, Dhaka, Bagladesh, 5 pages, Nov. 29, Dec. 1, 2019. Downloaded May 23, 2020.
Emir et al., "Comparative Study of Outlier Detection Algorithms via Fundamental Analysis Variables: An Application on Firms Listed in Borsa Instanbul," International Journal of Research in Business and Social Science IJRBS, vol. 4, No. 4, 16 pages, 2015.
Goldstein et al., "A Comparative Evaluation of Unsupervised Anamoly Detection Algorithms for Multivariate Data," PLOS One, 31 pages, Published Apr. 19, 2016.
Goldstein et al., "Histogram-Based Outlier Score (HBOS): A Fast Unsupervised Anomaly Detection Algorithm," German Research Center for Artificial Intelligence (DFKI), 1 pages, 2012.
Mehri et al., "Mitigating Privilege Misuse in Access Control through Anomaly Detection," Conference Paper, ARES, 11 pages, Aug. 29, Sep. 1, 2023, Benevento, Italy.
Wikipedia, Local Outlier Factor, 4 pages, Accessed Oct. 24, 2023.

(56) References Cited

OTHER PUBLICATIONS

Extended European Search Report, EP Application No. 25161772.6, European Patent Office, Aug. 27, 2025 (11 pages).

* cited by examiner

METHOD AND SYSTEM FOR CONTROLLING BUILDING ACCESS USING A MOBILE DEVICE

TECHNICAL FIELD

The present disclosure pertains generally to methods of controlling access to a controlled space and more particularly to methods and systems for using mobile devices in controlling access to a controlled space while detecting tailgating events.

BACKGROUND

Physical access control systems are designed to provide access to buildings and/or specific areas of a building for individuals who are authorized to access such areas and to deny access to buildings and/or specific areas of the building to individuals who are not authorized to access such areas. For example, certain individuals may be authorized to access a secure area of a building, whereas other individuals may not be allowed to access the secure area. In another example, certain individuals may be authorized to access a first building but not a second building, whereas other individuals may not be allowed to access either building. In some cases, access may be granted only during certain times.

Current approaches to physical access control systems often rely on users (e.g., employees) carrying physical access cards (e.g., physical badge) to gain entry to areas of a building. For example, a user can swipe a physical access card at an access card reader adjacent to a security door to gain entry to an area of a building. However, issuing and managing physical access card can be time consuming, cumbersome and error prone. What would be desirable is a system which allows a user's mobile device to act as an access credential for building access systems while the system is able to detect tailgating events.

SUMMARY

The present disclosure pertains generally to methods of controlling access to a controlled space and more particularly to methods and systems for using mobile devices in controlling access to a controlled space while detecting tailgating events. An example may be found in a method of controlling access through a door of a facility having a door lock that can be electrically locked and unlocked to control access to a secure area. The illustrative method includes establishing a wireless communication between one or more wireless access points and each of a plurality of mobile devices, wherein each of the plurality of mobile devices is associated with a particular user. One or more of the wireless access points wirelessly receive from each of the plurality of mobile devices a respective International Mobile Equipment Identity (IMEI) based identifier that is unique to the respective mobile device and operates as a user credential for the particular user that is associated with the respective mobile device. One or more of the wireless access points wirelessly identify a current location of each of the plurality of mobile devices. A determination is made as to when the current location of a first one of the plurality of mobile devices is outside of the secure area and within a predetermined proximity to the door and when the particular user of the first one of the plurality of mobile devices has access rights to gain access through the door. The door is electrically unlocked when the current location of the first one of the plurality of the mobile devices is within the predetermined proximity to the door and the particular user that is associated with the first one of the plurality of mobile devices has access rights to gain access through the door. In some cases, no third party application needs to be downloaded to the mobile device. A determination is made as to whether the particular user of a second one of the plurality of mobile devices does not have access rights to gain access through the door. A determination is made that the particular user of the second one of the plurality of mobile devices, which does not have access rights through the door, has improperly gained access through the door as a tailgater when the current location of the second one of the plurality of mobile devices is found to be within the secure area. A tailgater alarm is issued when the particular user of the second one of the plurality of mobile devices is determined to have improperly gained access through the door as a tailgater.

Another example may be found in a method of controlling access through a door of a facility having a door lock that can be electrically locked and unlocked to control access to a secure area. The illustrative method includes establishing a wireless communication between one or more wireless access points and a mobile device, wherein the mobile device is associated with a user. One or more of the wireless access points wirelessly receive from the mobile device an International Mobile Equipment Identity (IMEI) based identifier that is unique to the mobile device and operates as a user credential for the user that is associated with the mobile device. One or more of the wireless access points wirelessly identify a current location of mobile device. A determination is made as to when the current location of the mobile device is within a predetermined proximity to the door and when the user associated with the mobile that has the received IMEI-based identifier has access rights to gain access through the door. The door is electrically unlocked when the current location of the mobile device is within the predetermined proximity to the door and the user associated with the mobile device that has the received IMEI-based identifier has access rights to gain access through the door. The method includes monitoring how many people pass through the door while the door was electrically unlocked to allow the user associated with the mobile device that has the received IMEI-based identifier access through the door. A tailgater alarm is issued when more than one person passed through the door while the door was electrically unlocked to allow the user associated with the mobile device that has the received IMEI-based identifier access through the door.

Another example may be found in a method of controlling access through a door of a facility having a door lock that can be electrically locked and unlocked to control access to a secure area. The illustrative method includes establishing a wireless communication between one or more wireless access points and a mobile device, wherein the mobile device is associated with a user. One or more of the wireless access points wirelessly receive from the mobile device an International Mobile Equipment Identity (IMEI) based identifier that is unique to the mobile device and operates as a user credential for the user that is associated with the mobile device. One or more of the wireless access points identify a current location of mobile device. A determination is made as to when the current location of the mobile device is outside of the secure area and within a predetermined proximity to the door and when the user associated with the mobile device that has the received IMEI-based identifier has access rights to gain access through the door. The door is electrically unlocked when the current location of the mobile device is within the predetermined proximity to the door and the user associated with the mobile device that has the received IMEI-based identifier has access rights to gain access through the door. The method includes determining when the current location of the mobile device is found to be within the secure area without the door first being electrically unlocked to allow the user of the mobile device to gain access through the door and issuing a tailgater alarm when the current location of the mobile device is found to be within the secure area without the door first being electrically unlocked to allow the user of the mobile device to gain access through the door.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following detailed description of various embodiments in connection with the accompanying drawings, in which.

Figure 1:
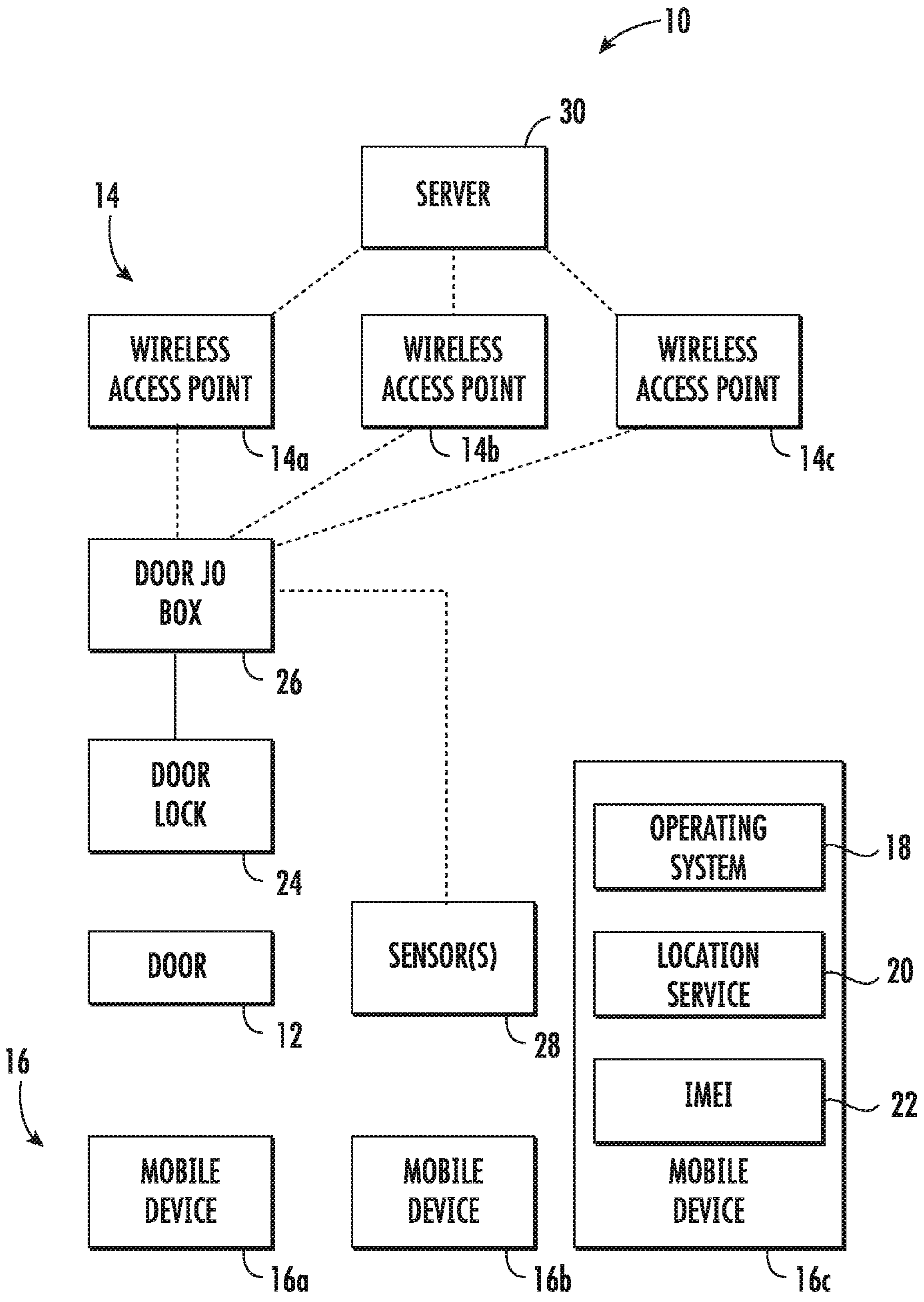
FIG. 1 is a schematic block diagram showing an illustrative access control system.

While the disclosure is amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DESCRIPTION

For the following defined terms, these definitions shall be applied, unless a different definition is given in the claims or elsewhere in this specification.

All numeric values are herein assumed to be modified by the term "about", whether or not explicitly indicated. The term "about" generally refers to a range of numbers that one of skill in the art would consider equivalent to the recited value (i.e., having the same function or result). In many instances, the term "about" may be indicative as including numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

Although some suitable dimensions ranges and/or values pertaining to various components, features and/or specifications are disclosed, one of skill in the art, incited by the present disclosure, would understand desired dimensions, ranges and/or values may deviate from those expressly disclosed.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following description should be read with reference to the drawings in which similar elements in different drawings are numbered the same. The drawings show by way of illustration how one or more embodiments of the disclosure may be practiced. The illustrative embodiments depicted are intended only as exemplary. Selected features of any illustrative embodiment may be incorporated into an additional embodiment unless clearly stated to the contrary.

User interaction with a door access control system can be streamlined using capabilities offered by mobile devices. For example, in some embodiments, a location service of a mobile device may determine a current location of the mobile device. The location service may use, for example, global positioning system (GPS) signals, cellular signals, Ultra-Wide-Band (UWB) signals, WiFi signals, Bluetooth signals, and/or other signals to determine the currently location of the mobile device. In another example, a communication service of the mobile device may be used to communicate with one or more remote devices, and to pass information between the mobile device and one or more remote devices. The one or more remote devices may determine the location of the mobile device, such as through triangularization. When so provided, rather than physically presenting a card (or other device) to an access card reader to gain access to an area or facility, the user carrying their mobile device may simply move within a particular distance of a door and be automatically granted access through the door. That is, rather than using "card readers", embodiments of the present disclosure allow a user's mobile device to perform the function of an access card, sometimes without requiring the download of a corresponding access control application from an application store. For example, the operating system of the mobile device itself may transmit a unique identifier of the mobile device and the location of the mobile device and/or one or more signals that can be used to determine the current location of the mobile device, and based on the current location of the mobile device and the unique identifier of the mobile device, a decision is made as to whether to unlock the door to allow access to the secure space.

It is contemplated that embodiments of the present disclosure may be utilized with a variety of access systems. In some cases, embodiments of the present disclosure may be used with or in place of systems with door access card readers (those with and/or without Bluetooth® capabilities). Alternatively, or additionally, embodiments of the present disclosure may be used with systems that only include an actuatable lock mechanism (e.g., no card readers present).

The present disclosure is generally directed towards methods and systems for allowing secure access to one or more access points (e.g. door, gate, corridor, etc.) using a mobile device. It is contemplated that the system may allow a user to access two different buildings having two different access control providers using the same mobile device. In some cases, the buildings may belong to the same entity (e.g., company and/or corporation) or the buildings may belong to different entities. Generally, access points may be tagged with a geographic location (e.g., latitude, longitude, and/or altitude) and a door name. These access points may be selectively made available to users via the user's mobile device. Actuation of an unlock button on the mobile device may result in the unlocking of the door. In some cases, the door may unlock automatically when the mobile device is in proximity to the door, and in some cases the mobile device is moved in a predetermined way adjacent the door (i.e. turns toward the door), without requiring the user to activate an unlock button or the like via the user interface of the mobile device.

Embodiments of the present disclosure can reduce the need to issue a physical badge for every location or facility that a person (e.g., an employee, a contractor, a repair person, etc.) needs to access. In some cases, embodiments of the present disclosure can be retrofit to existing access control systems with and/or without smart reader systems without having to add additional hardware. Further, embodiments of the present disclosure may streamline or facilitate access requests for access to facilities and/or locations. Embodiments of the present disclosure may allow access via a user's mobile device while being able to detect tailgating events, in which a first person is authorized to pass through a door, and one or more additional people pass through the temporarily unlocked door even though they are not authorized to do so.

FIG. 1 is a schematic block diagram showing an illustrative access control system 10 for controlling access through a door 12 of a facility. In some instances, the access control system 10 may be used to control access through a large number of different doors within the facility, but only one door 12 is shown here for simplicity. A door is used as an example of an access control point, and it is contemplated that the word "door" may be interpreted to include any access control barrier such as a traditional door, a gate, a turnstile and/or any other suitable access control barrier. The illustrative access control system 10 includes a number of wireless access points 14 individually labeled as 14*a*, 14*b* and 14*c*. While a total of three wireless access points 14 are shown, it will be appreciated that the access control system 10 may have any number of wireless access points 14. In some instances, the wireless access points 14 may include one or more beacons. In some instances, the wireless access points 14 may include one or more wireless 5G millimeter-wave access points (e.g. wireless 5G millimeter-wave router or a 5G cellular tower) or one or more UWB access points (e.g. wireless UWB routers).

The access control system 10 interacts with a number of mobile devices 16, individually labeled as 16*a*, 16*b* and 16*c*. The access control system 10 may interact with any number of mobile devices 16. In some instance, each individual within the facility may carry a mobile device 16. The mobile devices 16 may be, for example, mobile phones, tablet computers, laptop computers, dedicated access control devices and/or any other suitable mobile devices. The mobile devices 16 may be considered as being part of the access control system 10. Each mobile device 16 may include, as shown as part of the mobile device 16*c*, an operating system 18 that runs all of the processes running on the mobile device 16*c*, a location service 20 that allows the mobile device 16*c* to ascertain its own current location, and an IMEI-based identifier 22 that is unique to that particular mobile device 16*c*.

In some instances, the IMEI-based identifier 22 is actually the IMEI number for that mobile device 16. In some cases, the IMEI-based identifier 22 may be derived from the IMEI number of the mobile device. For example, in some cases, the IMEI number of the user's mobile device may be hashed with a sim card serial number of the user's mobile device to derive the IMEI-based identifier 22. In some cases, the hashed value may be encrypted to derive the IMEI-based identifier 22. These are just examples. In any event, the IMEI-based identifier 22 operates as a user credential for the access control system. In some instances, the operating system 18 of the mobile device 16 may be configured to wirelessly send a determined current location of the mobile device 16 and/or one or more signals that can be used to determine the current location of the mobile device, along with the IMEI-based identifier 22 that is unique to the mobile device 16, without first being prompted by an application program running on the mobile device 16. That is, in some cases, the operating system (OS) of the mobile device itself may transmit the unique identifier of the mobile device and the location of the mobile device and/or one or more signals that can be used to determine the current location of the mobile device.

In some instances, the operating system 18 of the mobile device 16 may only transmit the current location of the mobile device 16 (and/or the one or more signals that can be used to determine the current location of the mobile device) and the IMEI-based identifier 22 when the user is currently signed in to the mobile device 16, or after the user has unlocked the mobile device 16. Unlocking the mobile device 16 may entail entering a pin, or using bio-information such as face recognition or a thumbprint, for example. In some instances, the user may be required to unlock their mobile device 16 each time the user desires entry through a locked door. In some instances, the operating system 18 of the mobile device 16 may transmit the current location of the user's mobile device 16 (and/or one or more signals that can be used to determine the current location of the mobile device) and the IMEI-based identifier 22 regardless of whether the user's mobile device 16 has been signed into or otherwise unlocked.

In some instances, the mobile device 16 is configured to establish wireless communication with one or more of the wireless access points 14. The one or more wireless access points 14 may identify a current location of the mobile device 16 based at least in part on one or more characteristics of one or more signals received by the one or more of the wireless access points 14. The one or more signals transmitted by the mobile device 16 and received by the one or more of the wireless access points 14 may include, for example, cellular signals, Ultra-Wide-Band (UWB) signals, WiFi signals, Bluetooth signals, and/or other signals, to help in determining the current location of the user's mobile device. In some cases, a location service of the operating system 18 of the mobile device 16 may determine the current location of the user's mobile device, and send the current location of the mobile device to the one or more of the wireless access points 14. The location service of the mobile device 16 may use, for example, global positioning system (GPS) signals, cellular signals, Ultra-Wide-Band (UWB) signals, WiFi signals, Bluetooth signals, and/or other signals to determine the currently location of the mobile device 16.

The access control system 10 includes a door lock 24 that is configured to lock and unlock the door 12 of the facility.

In some cases, the door lock 24 may be configured to be locked and unlocked electronically. As shown, the access control system 10 includes a door IO box 26 that is coupled with the door lock 24. In some instances, the door IO box 26 provides a wired or wireless connection between the door lock 24 and the rest of the access control system 10. In some cases, the door lock 24 itself is able to communicate wirelessly. In such cases, the door IO box 26 may be excluded. In some instances, the functionality of the door IO box 26 may also be built into the door lock 24.

In some instances, the access control system 10 may include one or more sensors 28. In some cases, the one or more sensors 28 may be used by the access control system 10 to detect possible occurrences of tailgating, which is when one or more unauthorized people slip through an unlocked door with or behind an authorized person. The one or more sensors 28 may be deployed by each of a number of different doors 12 within the facility. If one person was authorized to pass through the door 12 into a hallway, for example, and a total of three people are detected by the one or more sensors 28 immediately after the door 12 was unlocked, this may be an indication of tailgating. The one or more sensors 28 may include ultrasonic or radar-based sensors that are able to detect how many people are in a particular space. In some cases, the one or more sensors 28 may include a beam-break sensor. In some cases, the one or more sensors 28 may include a video system that is able to capture a video stream and then utilize various video analytics algorithms to determine how many people have passed through the door while the door was unlocked. In some cases, the video analytics algorithms may include facial recognition algorithms that may be used to identify the person or persons suspected of tailgating. In some cases, the wireless access points 14 may be in communication with a server 30. The server 30 may be a local server or a remote or cloud-based server. In some cases, the server 30 may be used to help identify, track and monitor possible tailgating events.

Figure 2:
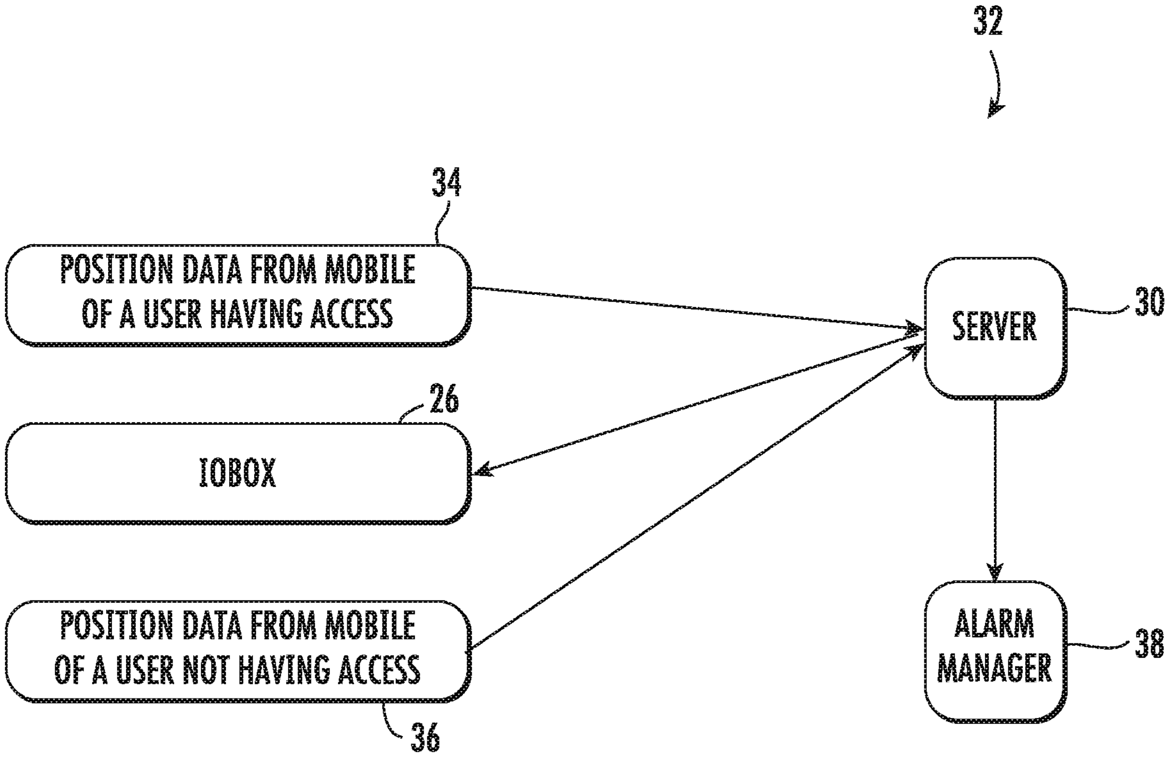
FIG. 2 is a schematic block diagram showing an illustrative scheme to detect an unauthorized individual with a mobile device that is attempting to access a secure space as a tailgater.

FIG. 2 is a schematic block diagram showing an illustrative scheme 32 for detecting possible tailgating when both an authorized person and an unauthorized individual has a mobile device 16. The server 30 (and/or in some cases one or more of the wireless access points 14) receives a unique identifier and position data from a mobile device 16 of an authorized person, as indicated at block 34. In some cases, the unique identifier may include the IMEI-based identifier 22 from the authorized person's mobile device 16, and the position data may include a current location of the authorized person's mobile device 16. In response, and when the current position of the authorized person's mobile device 16 is near the door 12, the server 30 (and/or in some cases one or more of the wireless access points 14) instructs the door IO box 26 to unlock the door lock 24 and allow the authorized person to pass through the door 12.

In the example show, the server 30 (and/or in some cases one or more of the wireless access points 14) also receives a unique identifier and position data from an unauthorized person having a mobile device 16, as indicated at block 36. In some cases, the unique identifier may include the IMEI-based identifier 22 from the unauthorized person's mobile device 16, and the position data may include a current location of the unauthorized person's mobile device 16. When it is determined that the current location of the unauthorized person's mobile device 16 has passed from outside of the secure area to inside of the secure area during the time that the door was unlocked to allow the authorized user access to the secure area, the server 30 sends a tailgater alert to the Alarm Manager 38. The Alarm Manager 38 issues a tailgater alarm indicating that the unauthorized person has improperly gained access through the door as a tailgater. The Alarm Manager 38 may be part of a security system, for example.

Figure 3:
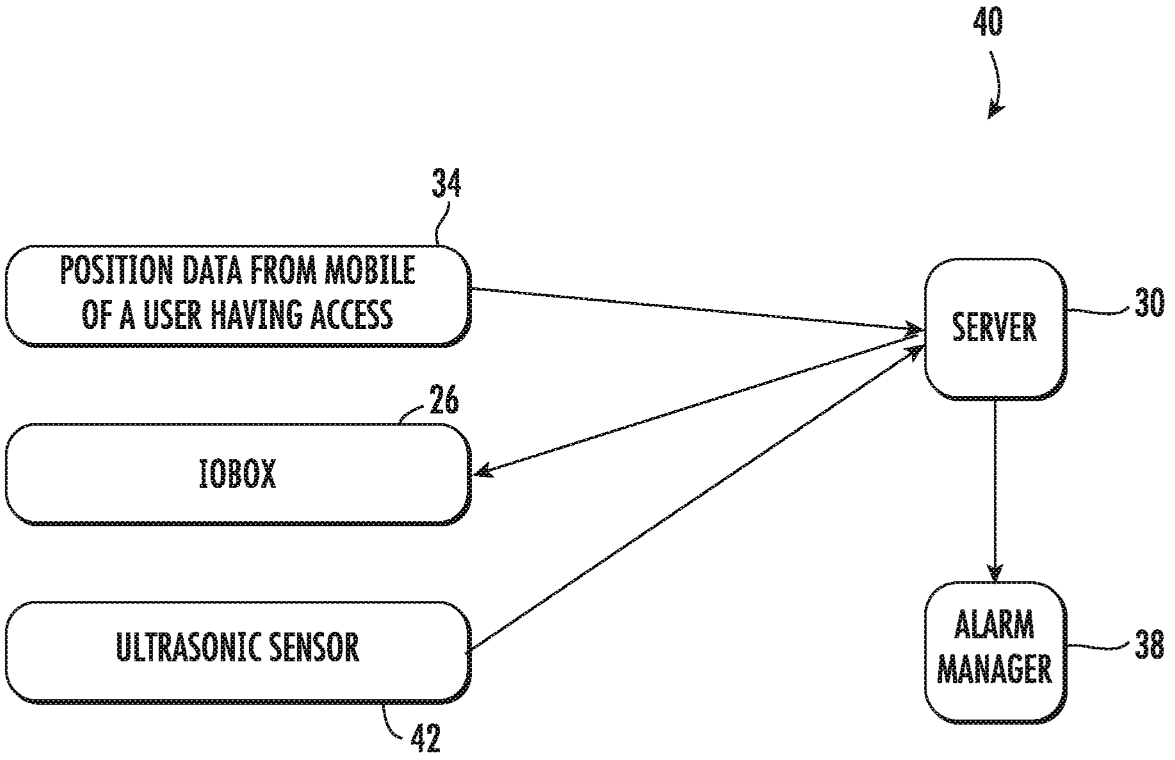
FIG. 3 is a schematic block diagram showing an illustrative scheme utilizing an ultrasonic sensor to detect an unauthorized individual without an active mobile device that is attempting to access a secure space as a tailgater.

FIG. 3 is a schematic block diagram showing an illustrative scheme 40 for detecting possible tailgating when an authorized person has a mobile device 16 while an unauthorized person does not (or the mobile device 16 of the unauthorized person is inactive such as being turned off). The server 30 (and/or in some cases one or more of the wireless access points 14) receives a unique identifier and position data from a mobile device 16 of an authorized person, as indicated at block 34. In some cases, the unique identifier may include the IMEI-based identifier 22 from the authorized person's mobile device 16, and the position data may include a current location of the authorized person's mobile device 16. In response, and when the current position of the authorized person's mobile device 16 is near the door 12, the server 30 (and/or in some cases one or more of the wireless access points 14) instructs the door IO box 26 to unlock the door lock 24 and allow the authorized person to pass through the door 12. In this example, an ultrasonic sensor 42 sends multiple interferences to the server 30 (and/or in some cases one or more of the wireless access points 14), instead of just one. Each inference corresponds to the detection of one person passing through the door during the time that the door was unlocked to allow the authorized user access to the secure area. This means that more than one person was found passing through the door 12, instead of just the expected one authorized person. In response, the server 30 sends a tailgater alert to the Alarm Manager 38. The Alarm Manager 38 issues a tailgater alarm indicating that one or more unauthorized persons have improperly gained access through the door as a tailgater.

Figure 4:
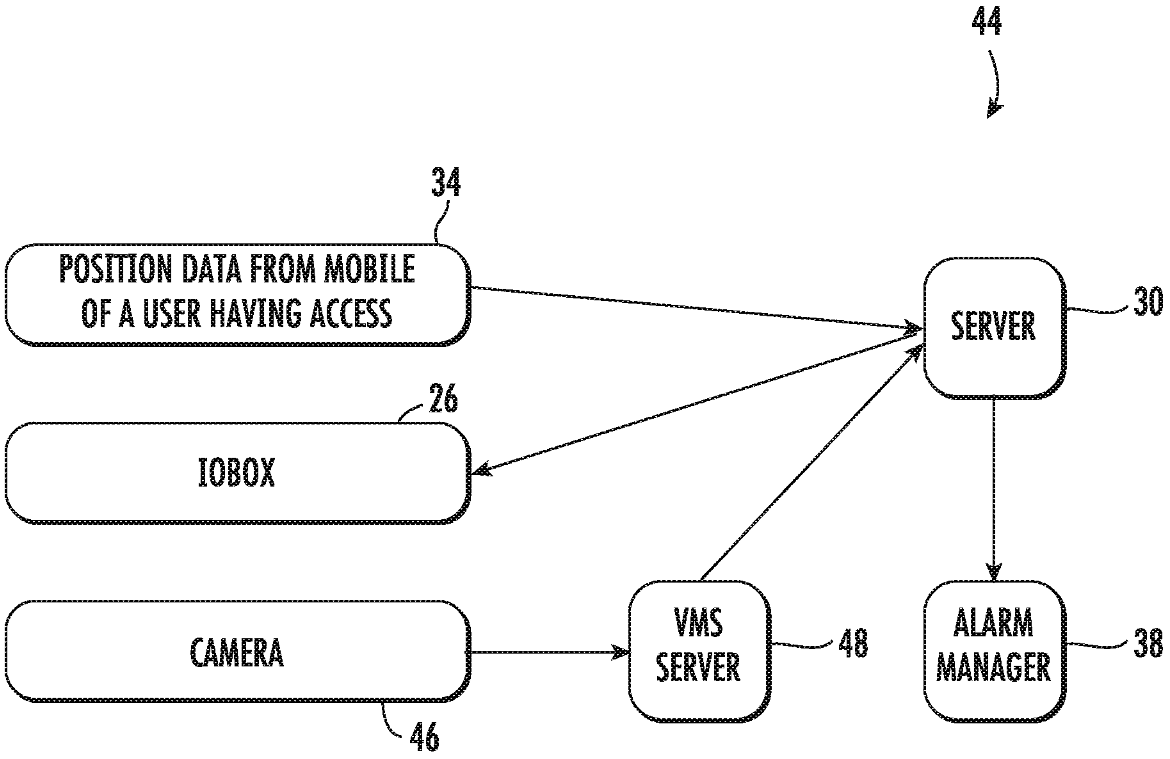
FIG. 4 is a schematic block diagram showing an illustrative scheme utilizing a video system to detect an unauthorized individual without an active mobile device that is attempting to access a secure space as a tailgater.

FIG. 4 is a schematic block diagram showing an illustrative scheme 44 for detecting possible tailgating when an authorized person has a mobile device 16 while an unauthorized person does not (or the mobile device 16 of the unauthorized person is inactive such as being turned off). The server 30 (and/or in some cases one or more of the wireless access points 14) receives a unique identifier and position data from a mobile device 16 of an authorized person, as indicated at block 34. In some cases, the unique identifier may include the IMEI-based identifier 22 from the authorized person's mobile device 16, and the position data may include a current location of the authorized person's mobile device 16. In response, and when the current position of the authorized person's mobile device 16 is near the door 12, the server 30 (and/or in some cases one or more of the wireless access points 14) instructs the door IO box 26 to unlock the door lock 24 and allow the authorized person to pass through the door 12. In this example, a camera 46 captures one or more images of the space around the door 12, or perhaps the space just upstream or downstream of the door 12, and provides the one or more images to a VMS (video management system) server 48. The VMS server 48 utilizes video analytics algorithms to count the number of people found passing through the door 12 during the time that the door 12 was unlocked to allow the authorized user access to the secure area, and reports the count to the server 30. The server 30 detects a mismatch between the number of people authorized to pass through the door 12 and a total number of people who did pass, and when there is a mismatch, sends a tailgater alert to the Alarm Manager 38. The Alarm Manager 38 issues a tailgater alarm indicating that one or more unauthorized persons have improperly gained access through the door as a tailgater. In some cases, the video analytics algorithms may include facial recognition algorithms that may be used to identify and report the identity of the person or persons suspected of tailgating.

Figure 5A:
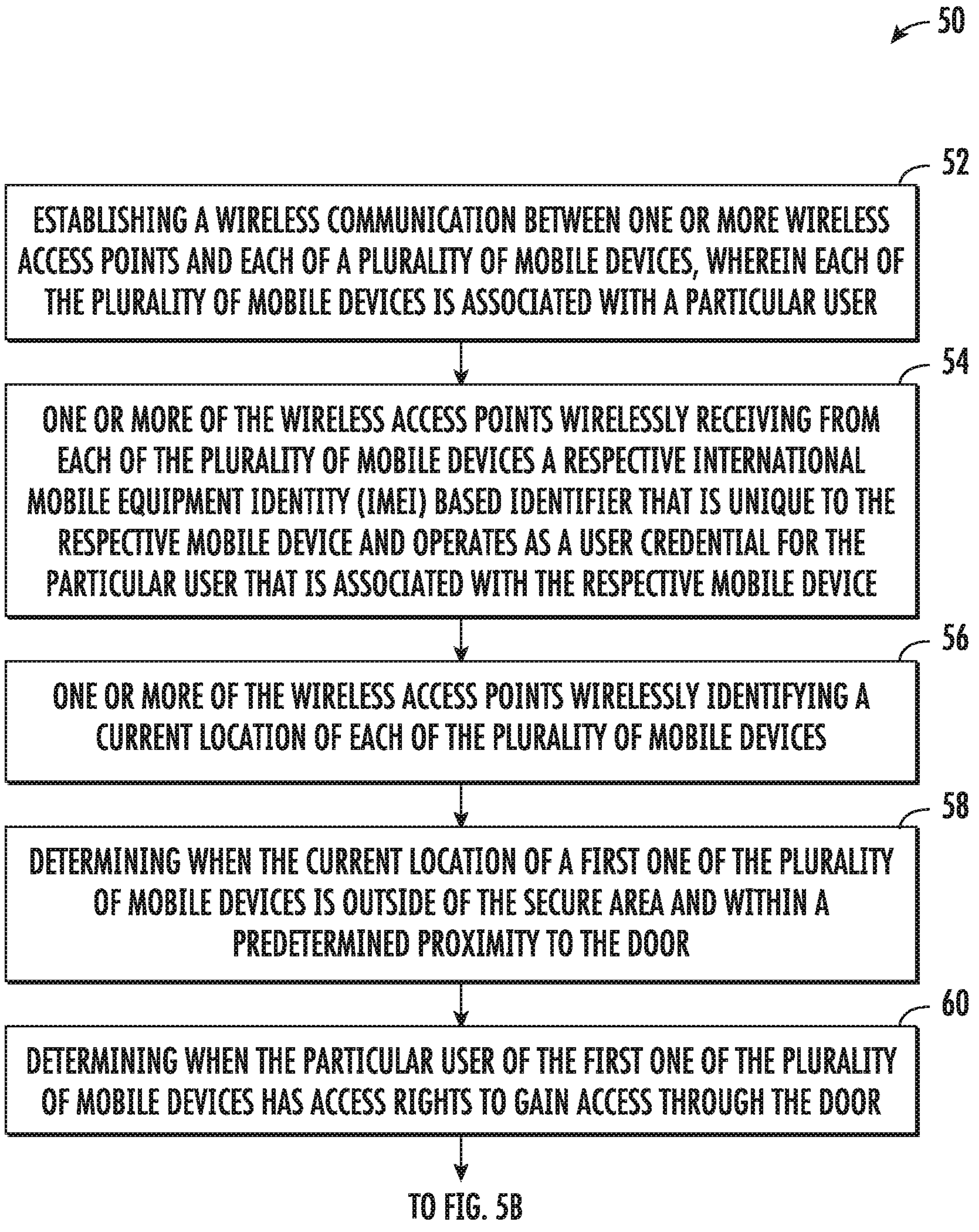
FIGS. 5A and 5B are flow diagrams that together show an illustrative method of controlling access to a secure space.
Figure 5B:
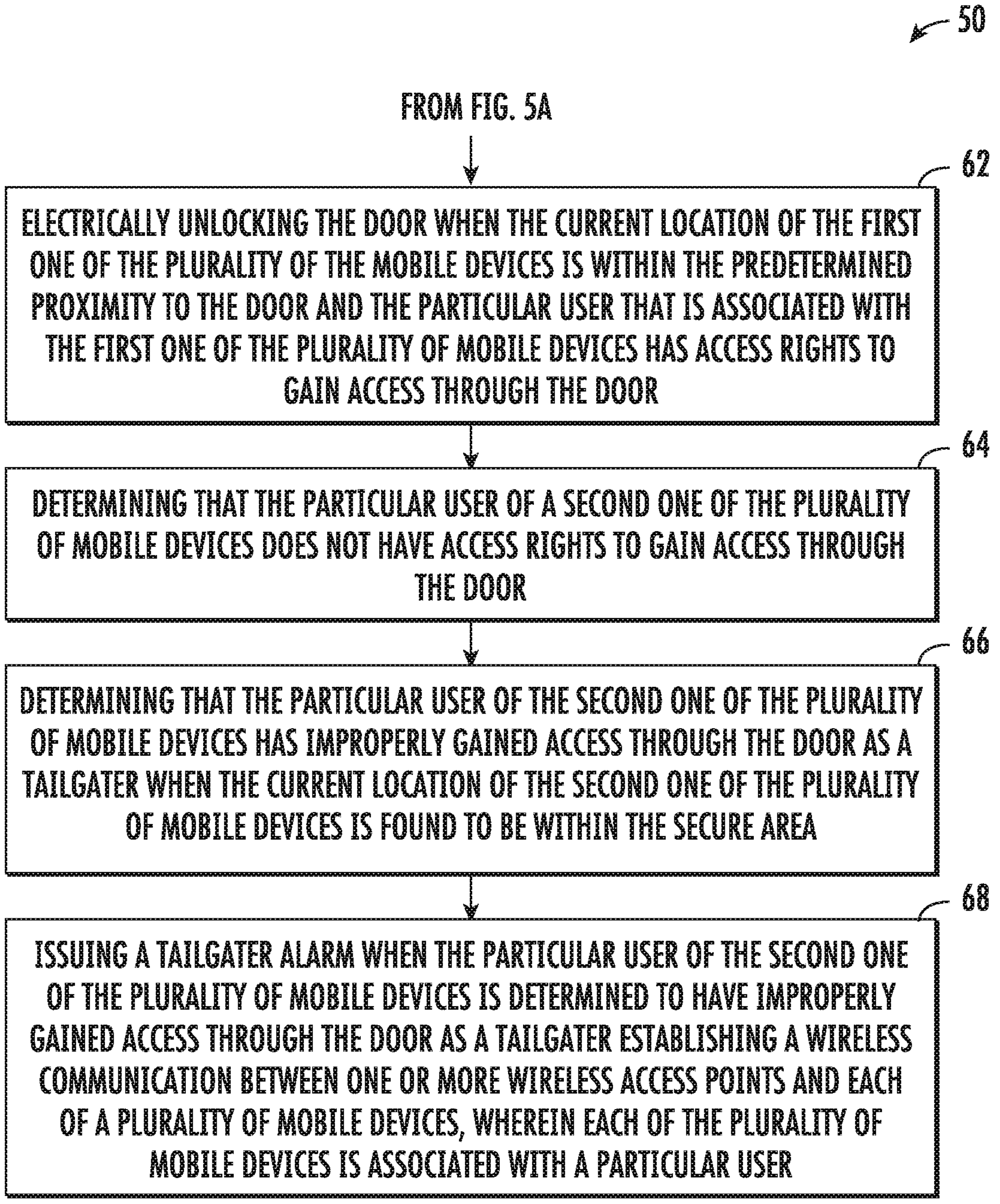

FIGS. 5A and 5B are flow diagrams that together show an illustrative method 50 of controlling access through a door (such as the door 12) of a facility having a door lock (such as the door lock 24) that can be electrically locked and unlocked to control access to a secure area. The illustrative method 50 includes establishing a wireless communication between one or more wireless access points (such as the wireless access points 14) and each of a plurality of mobile devices (such as the mobile devices 16), wherein each of the plurality of mobile devices is associated with a particular user, as indicated at block 52. In some cases, the wireless access points may include one or more 5G millimeter-wave access points, and the wireless communication between the one or more wireless access points and each of the plurality of mobile devices may include sending and receiving one or more 5G millimeter-wave signals. In some cases, each of the one or more wireless access points may include an Ultra-Wide Band (UWB) access point, and the wireless communication between the one or more wireless access points and each of the plurality of mobile devices may include sending and receiving one or more Ultra-Wide Band (UWB) signals. In some cases, the wireless access points may include one or more 4G access points, and the wireless communication between the one or more wireless access points and each of the plurality of mobile devices may include sending and receiving one or more 4G signals. In some cases, the wireless access points may include one or more WiFi access points, and the wireless communication between the one or more wireless access points and each of the plurality of mobile devices may include sending and receiving one or more WiFi signals. In some cases, the wireless access points may include one or more Bluetooth access points, and the wireless communication between the one or more wireless access points and each of the plurality of mobile devices may include sending and receiving one or more Bluetooth signals. These are just examples.

In this example, one or more of the wireless access points wirelessly receive from each of the plurality of mobile devices a respective International Mobile Equipment Identity (IMEI) based identifier that is unique to the respective mobile device and operates as a user credential for the particular user that is associated with the respective mobile device, as indicated at block 54. One or more of the wireless access points wirelessly identify a current location of each of the plurality of mobile devices, as indicated at block 56. In some cases, each of the plurality of mobile devices determined its own current location via a location service of the respective mobile device and then sends their current location to one or more of the one or more wireless access points. In some cases, the current location of each of the mobile devices may be determined by receiving at one or more wireless communication signals from each of the plurality of mobile devices, and then one or more of the wireless access points identify the current location of each of the plurality of mobile device based at least in part on one or more characteristics of the wireless communication signals received from each of the plurality of mobile devices. In some cases, two or more of the wireless access points wirelessly receive wireless communication signals from each of the plurality of mobile devices, and one or more of the wireless access points identify the current location of each of the plurality of mobile device based on a triangularization using the wireless communication signals that are wirelessly received by two or more of the wireless access points from each of the plurality of mobile devices.

A determination is made as to when the current location of a first one of the plurality of mobile devices is outside of the secure area and within a predetermined proximity to the door, as indicated at block 58. A determination is made as to when the particular user of the first one of the plurality of mobile devices has access rights to gain access through the door, as indicated at block 60. Continuing on FIG. 5B, the method 50 includes electrically unlocking the door when the current location of the first one of the plurality of the mobile devices is within the predetermined proximity to the door and the particular user that is associated with the first one of the plurality of mobile devices has access rights to gain access through the door, as indicated at block 62. A determination is made that the particular user of a second one of the plurality of mobile devices does not have access rights to gain access through the door, as indicated at block 64. A determination is made that the particular user of the second one of the plurality of mobile devices has improperly gained access through the door as a tailgater when the current location of the second one of the plurality of mobile devices is found to be within the secure area, as indicated at block 66. A tailgater alarm is issued when the particular user of the second one of the plurality of mobile devices is determined to have improperly gained access through the door as a tailgater, as indicated at block 68.

In some instances, each of the plurality of mobile devices includes an operating system (OS), wherein the OS of each of the plurality of mobile devices may be configured to wirelessly send the IMEI-based identifier of the respective mobile device to one or more of the wireless access points without first being prompted by a third-party application program that has been downloaded by a user to the respective mobile device. In some cases, the OS of each of the plurality of mobile devices may be configured to identify the current location of the respective mobile device and to wirelessly send the current location of the respective mobile device to one or more of the wireless access points without first being prompted by a third-party application program that has been downloaded by a user to the respective mobile device. In some cases, each of the plurality of mobile devices may hash an IMEI number of the respective mobile device with a sim card serial number of the respective mobile device to form the IMEI-based identifier. In some cases, each of the plurality of mobile devices may hash an IMEI number of the respective mobile device with a sim card serial number of the respective mobile device to arrive at a hashed value, and may encrypt the hashed value to form the IMEI-based identifier.

In some cases, one or more of the wireless access points and/or one or more servers (such as the server 30) operatively coupled to the one or more wireless access points is/are configured to determine when the current location of the first one of the plurality of mobile devices is outside of the secure area and within a predetermined proximity to the door and to determine when the particular user of the first one of the plurality of mobile devices has access rights to gain access through the door. One or more of the wireless access points and/or one or more servers (such as the server 30) operatively coupled to the one or more wireless access points may be configured to electrically unlock the door when the current location of the first one of the plurality of the mobile devices is within the predetermined proximity to the door and the particular user that is associated with the first one of the plurality of mobile devices has access rights to gain access through the door. One or more of the wireless access points and/or one or more servers (such as the server 30) operatively coupled to the one or more wireless access points may be configured to determine that the particular user of the second one of the plurality of mobile devices does not have access rights to gain access through the door, determine that the particular user of the second one of the plurality of mobile devices has improperly gained access through the door as a tailgater when the current location of the second one of the plurality of mobile devices is found to be within the secure area, and to issue the tailgater alarm when the particular user of the second one of the plurality of mobile devices is determined to have improperly gained access through the door as a tailgater.

Figure 6A:
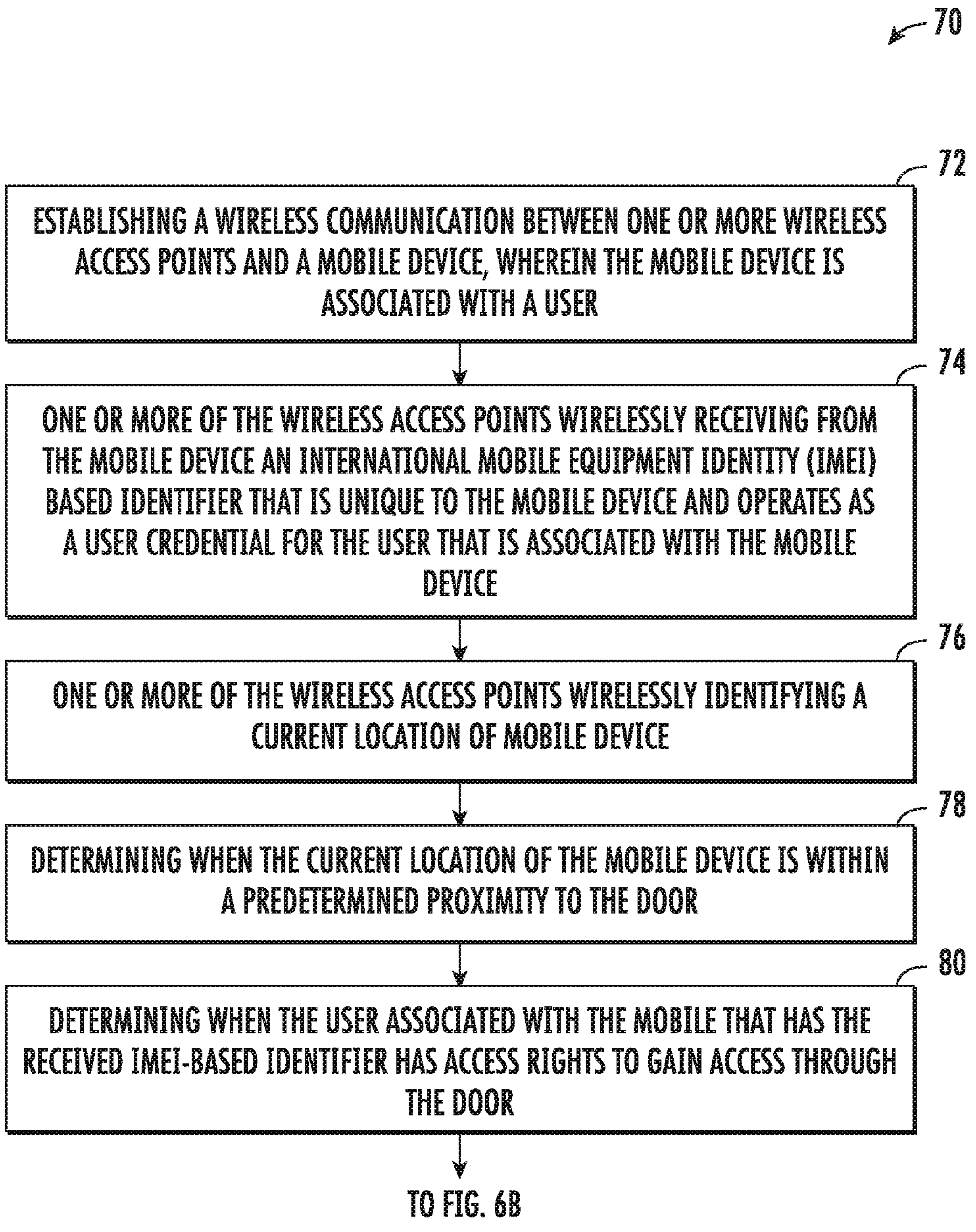
FIGS. 6A and 6B are flow diagrams that together show an illustrative method of controlling access to a secure space.
Figure 6B:
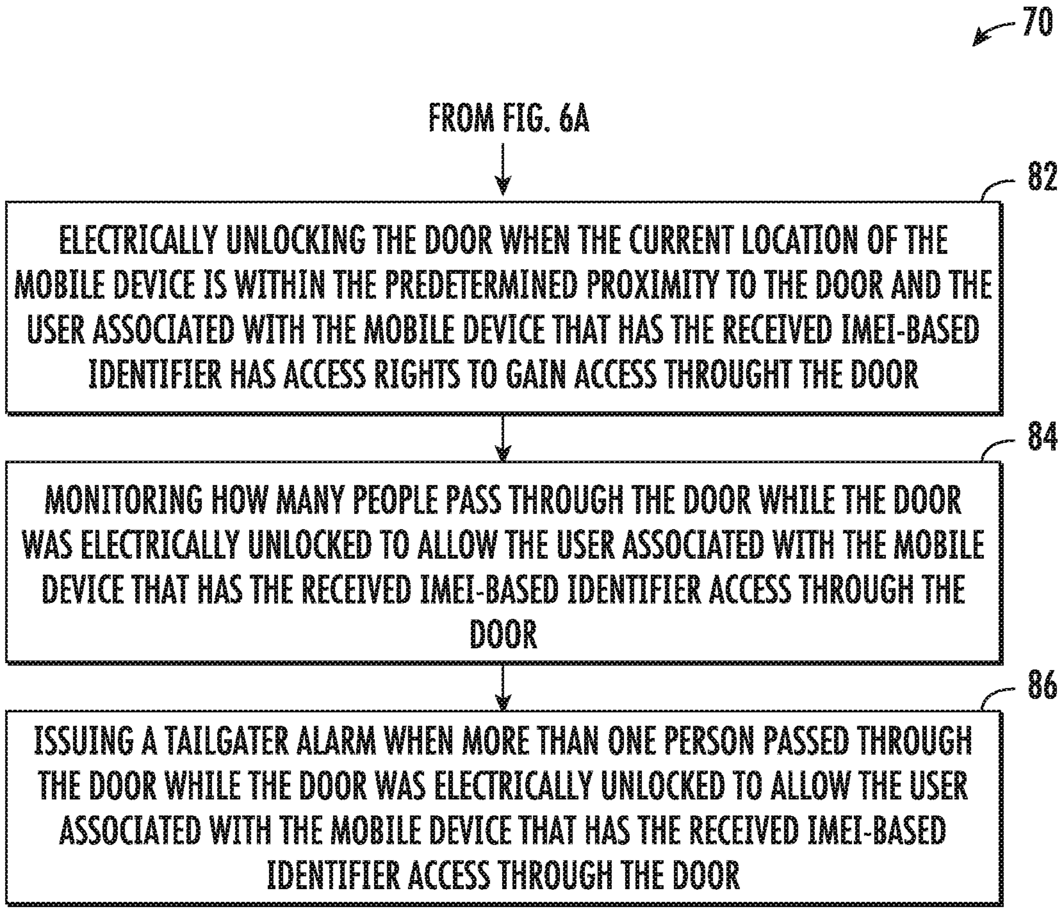

FIGS. 6A and 6B are flow diagrams that together show an illustrative method 70 of controlling access through a door (such as the door 12) of a facility having a door lock (such as the door lock 24) that can be electrically locked and unlocked to control access to a secure area. The illustrative method 70 includes establishing a wireless communication between one or more wireless access points and a mobile device, wherein the mobile device is associated with a user, as indicated at block 72. In some cases, the wireless access points may include one or more 5G millimeter-wave access points, and the wireless communication between the one or more wireless access points and each of the plurality of mobile devices may include sending and receiving one or more 5G millimeter-wave signals. In some cases, each of the one or more wireless access points may include an Ultra-Wide Band (UWB) access point, and the wireless communication between the one or more wireless access points and each of the plurality of mobile devices may include sending and receiving one or more Ultra-Wide Band (UWB) signals. In some cases, the wireless access points may include one or more 4G access points, and the wireless communication between the one or more wireless access points and each of the plurality of mobile devices may include sending and receiving one or more 4G signals. In some cases, the wireless access points may include one or more WiFi access points, and the wireless communication between the one or more wireless access points and each of the plurality of mobile devices may include sending and receiving one or more WiFi signals. In some cases, the wireless access points may include one or more Bluetooth access points, and the wireless communication between the one or more wireless access points and each of the plurality of mobile devices may include sending and receiving one or more Bluetooth signals. These are just examples.

One or more of the wireless access points wirelessly receive from the mobile device an International Mobile Equipment Identity (IMEI) based identifier that is unique to the mobile device and operates as a user credential for the user that is associated with the mobile device, as indicated at block 74. One or more of the wireless access points wirelessly identify a current location of mobile device, as indicated at block 76. A determination is made as to when the current location of the mobile device is within a predetermined proximity to the door, as indicated at block 78. A determination is made as to when the user associated with the mobile that has the received IMEI-based identifier has access rights to gain access through the door, as indicated at block 80.

Continuing on FIG. 6B, the door is electrically unlocked when the current location of the mobile device is within the predetermined proximity to the door and the user associated with the mobile device that has the received IMEI-based identifier has access rights to gain access through the door, as indicated at block 82. How many people pass through the door while the door was electrically unlocked to allow the user associated with the mobile device that has the received IMEI-based identifier access through the door is monitored, as indicated at block 84. A tailgater alarm is issued when more than one person passed through the door while the door was electrically unlocked to allow the user associated with the mobile device that has the received IMEI-based identifier access through the door, as indicated at block 86.

In some instances, monitoring how many people pass through the door while the door was electrically unlocked to allow the user associated with the mobile device that has the received IMEI-based identifier access through the door may include monitoring an output of an ultrasonic sensor with a field of view that includes a region where people passing through the door must pass, and based on the output of the ultrasonic sensor, counting how many individual people passed through the door while the door was electrically unlocked to allow the user associated with the mobile device that has the received IMEI-based identifier access through the door In some cases, monitoring how many people pass through the door while the door was electrically unlocked to allow the user associated with the mobile device that has the received IMEI-based identifier access through the door may include capturing a video stream of a region where people passing through the door must pass and then processing the video stream with video analytics to count how many individual people passed through the door while the door was electrically unlocked to allow the user associated with the mobile device that has the received IMEI-based identifier access through the door.

In some cases, monitoring how many people pass through the door while the door was electrically unlocked to allow the user associated with the mobile device that has the received IMEI-based identifier access through the door may include monitoring an output of a radar based sensor with a field of view that includes a region where people passing through the door must pass and based on the output of the radar based sensor, counting how many individual people passed through the door while the door was electrically unlocked to allow the user associated with the mobile device that has the received IMEI-based identifier access through the door. In some cases, the radar based sensor includes one or more transceivers, and a controller for processing incoming signals received as a result of electromagnetic radiation emitted from the one or more transceivers being reflected back to the one or more transceivers.

In some cases, monitoring how many people pass through the door while the door was electrically unlocked to allow the user associated with the mobile device that has the received IMEI-based identifier access through the door may include monitoring a beam break sensor that counts how many beam breaks and/or sequence of beam breaks that occurred while the door was electrically unlocked to allow the user associated with the mobile device that has the received IMEI-based identifier access through the door. In some cases, two or more beam break sensors may be spaced along a path where people passing through the door must pass. The number of beam breaks may be an indication of how many people passed through the door while the door was electrically unlocked to allow the user associated with the mobile device that has the received IMEI-based identifier access through the door. These sensors are just examples. Other sensors and/or combination of these and other sensors, may be used to determine how many people passed through the door while the door was electrically unlocked to allow the user associated with the mobile device that has the received IMEI-based identifier access through the door.

Figure 7A:
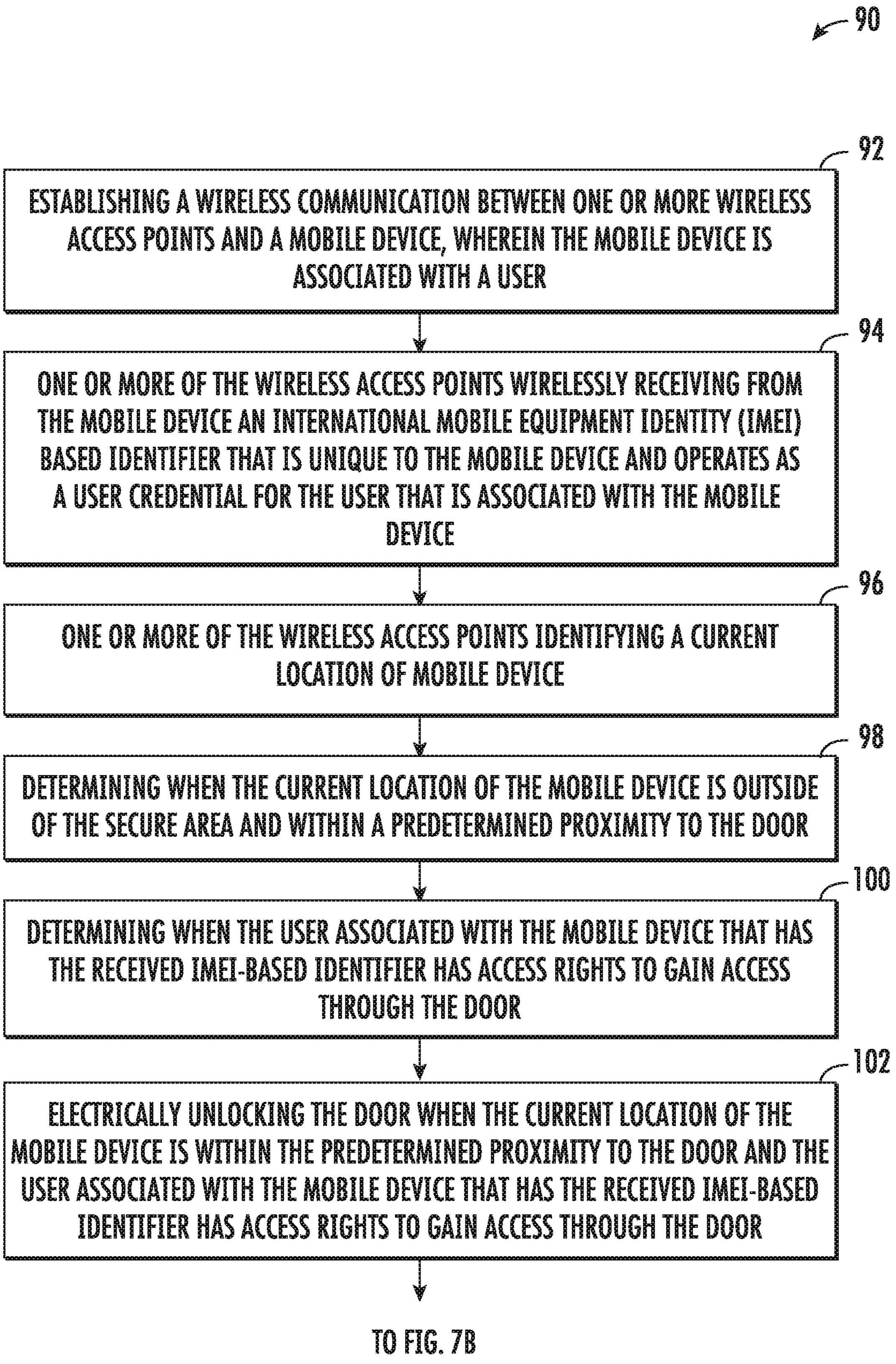
FIGS. 7A, 7B and 7C are flow diagrams that together show an illustrative method of controlling access to a secure space.
Figure 7B:
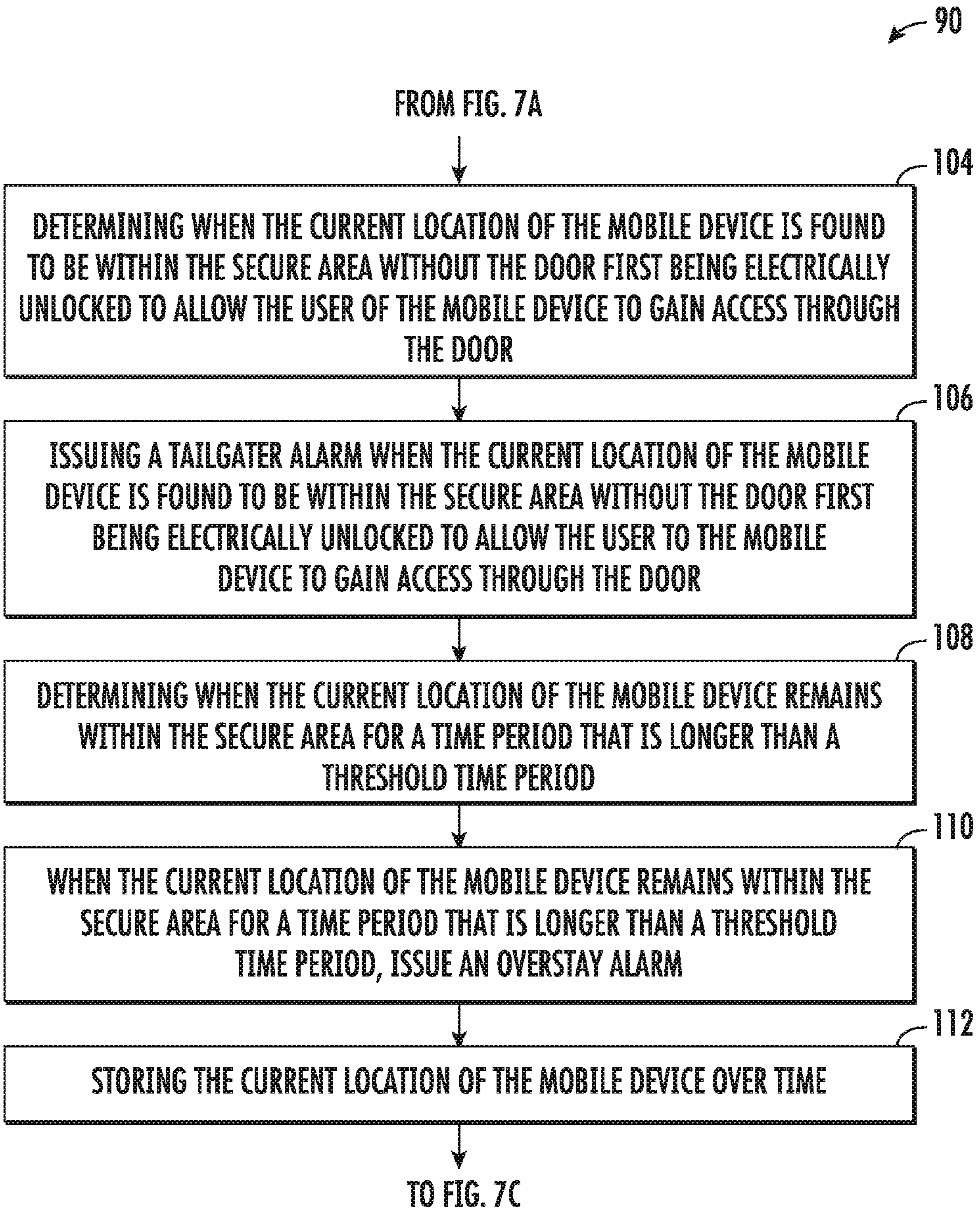
Figure 7C:
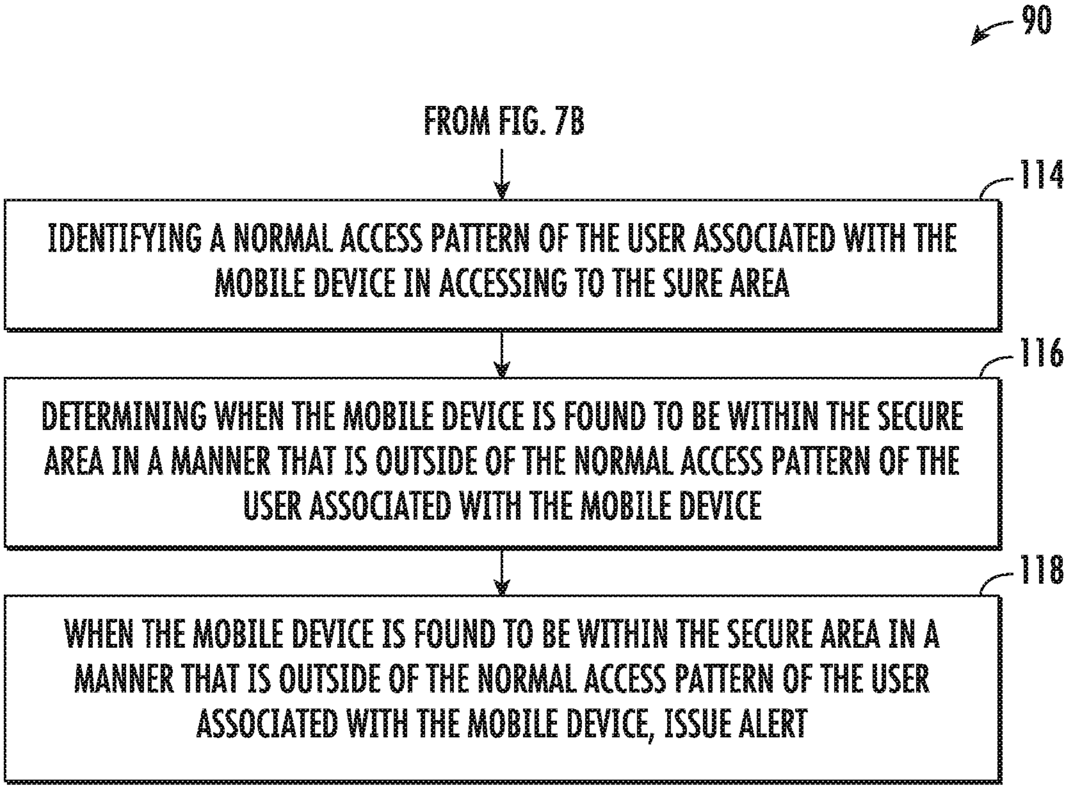

FIGS. 7A, 7B and 7C are flow diagrams that together show an illustrative method 90 of controlling access through a door (such as the door 12) of a facility having a door lock (such as the door lock 24) that can be electrically locked and unlocked to control access to a secure area. The illustrative method 90 includes establishing a wireless communication between one or more wireless access points and a mobile device, wherein the mobile device is associated with a user, as indicated at block 92. One or more of the wireless access points wirelessly receive from the mobile device an International Mobile Equipment Identity (IMEI) based identifier that is unique to the mobile device and operates as a user credential for the user that is associated with the mobile device, as indicated at block 94. One or more of the wireless access points identify a current location of mobile device, as indicated at block 96.

A determination is made as to when the current location of the mobile device is outside of the secure area and within a predetermined proximity to the door, as indicated at block 98. A determination is made as to when the user associated with the mobile device that has the received IMEI-based identifier has access rights to gain access through the door, as indicated at block 100. The door is electrically unlocked when the current location of the mobile device is within the predetermined proximity to the door and the user associated with the mobile device that has the received IMEI-based identifier has access rights to gain access through the door, as indicated at block 102.

Continuing on FIG. 7B, a determination is made as to when the current location of the mobile device is found to be within the secure area without the door first being electrically unlocked to allow the user of the mobile device to gain access through the door, as indicated at block 104. This may occur when the user that has access rights to gain access through the door turns off his/her phone and enters the secure space as a tailgater, and then turns his/her phone back on later inside of the secure space. A tailgater alarm is issued when the current location of the mobile device is found to be within the secure area without the door first being electrically unlocked to allow the user of the mobile device to gain access through the door, as indicated at block 106.

Alternatively, or in addition, in some cases, the method 90 may include determining when the current location of the mobile device remains within the secure area for a time period that is longer than a threshold time period, as indicated at block 108. When the current location of the mobile device remains within the secure area for a time period that is longer than a threshold time period, an overstay alarm may be issued, as indicated at block 110.

Alternatively, or in addition, in some cases, the method 90 may include storing the current location of the mobile device over time, as indicated at block 112. Continuing on FIG. 7C, the method 90 may include identifying a normal access pattern of the user associated with the mobile device in accessing the secure area, as indicated at block 114. A determination may be made as to when the mobile device is found to be within the secure area in a manner that is outside of the normal access pattern of that particular user associated with the mobile device, as indicated at block 116. When the mobile device is found to be within the secure area in a manner that is outside of the normal access pattern of the user associated with the mobile device, an alert may be issued as indicated at block 118.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A method of controlling access through a door of a facility having a door lock that can be electrically locked and unlocked to control access to a secure area, the method comprising:

establishing a wireless communication between one or more wireless access points and each of a plurality of mobile devices, wherein each of the plurality of mobile devices is associated with a particular user;

hashing, by each of the plurality of mobile devices, an International Mobile Equipment Identity (IMEI) number of the respective mobile device with a sim card serial number of the respective mobile device to form an IMEI-based identifier for each respective mobile device;

one or more of the wireless access points wirelessly receiving from each of the plurality of mobile devices a respective IMEI-based identifier that is unique to the respective mobile device and operates as a user credential for the particular user that is associated with the respective mobile device;

one or more of the wireless access points wirelessly identifying a current location of each of the plurality of mobile devices;

determining when the current location of a first one of the plurality of mobile devices is outside of the secure area and within a predetermined proximity to the door;

determining when the particular user of the first one of the plurality of mobile devices has access rights to gain access through the door;

electrically unlocking the door when the current location of the first one of the plurality of the mobile devices is within the predetermined proximity to the door and the particular user that is associated with the first one of the plurality of mobile devices has access rights to gain access through the door;

determining that the particular user of a second one of the plurality of mobile devices does not have access rights to gain access through the door;

determining that the particular user of the second one of the plurality of mobile devices has improperly gained access through the door as a tailgater when the current location of the second one of the plurality of mobile devices is found to be within the secure area; and issuing a tailgater alarm when the particular user of the second one of the plurality of mobile devices is determined to have improperly gained access through the door as a tailgater.

2. The method of claim 1, wherein identifying the current location of each of the plurality of mobile device by the one or more of the wireless access points comprises:

each of the plurality of mobile devices determined its own current location via a location service of the respective mobile device; and each of the plurality of mobile devices sending their current location to one or more of the one or more wireless access points.

3. The method of claim 1, wherein identifying the current location of each of the plurality of mobile device by the one or more of the wireless access points comprises:

receiving at one or more of the wireless access points wireless communication signals from each of the plurality of mobile devices; and one or more of the wireless access points identifying the current location of each of the plurality of mobile device based at least in part on one or more characteristics of the wireless communication signals received from each of the plurality of mobile devices.

4. The method of claim 3, wherein two or more of the wireless access points wirelessly receiving wireless communication signals from each of the plurality of mobile devices, and wherein one or more of the wireless access points identify the current location of each of the plurality of mobile device based on a triangularization using the wireless communication signals that are wirelessly received by two or more of the wireless access points from each of the plurality of mobile devices.

5. The method of claim 1, wherein each of the one or more wireless access points include a 5G millimeter-wave access point, and wherein the wireless communication between the one or more wireless access points and each of the plurality of mobile devices includes sending and receiving one or more 5G millimeter-wave signals.

6. The method of claim 1, wherein each of the one or more wireless access points include an Ultra-Wide Band (UWB) access point, and wherein the wireless communication between the one or more wireless access points and each of the plurality of mobile devices includes sending and receiving one or more Ultra-Wide Band (UWB) signals.

7. The method of claim 1, wherein each of the plurality of mobile devices includes an operating system (OS), wherein the OS of each of the plurality of mobile devices is configured to wirelessly send the IMEI-based identifier of the respective mobile device to one or more of the wireless access points without first being prompted by a third party application program that has been downloaded by a user to the respective mobile device.

8. The method of claim 1, wherein each of the plurality of mobile devices includes an operating system (OS), wherein the OS of each of the plurality of mobile devices is configured to identify the current location of the respective mobile device and to wirelessly send the current location of the respective mobile device to one or more of the wireless access points without first being prompted by a third party application program that has been downloaded by a user to the respective mobile device.

9. The method of claim 1, wherein each of the plurality of mobile devices hashing the IMEI number of the respective mobile device with the sim card serial number of the respective mobile device to arrive at a hashed value, and further encrypting the hashed value to form the IMEI-based identifier.

10. The method of claim 1, wherein one or more of the wireless access points and/or one or more servers operatively coupled to the one or more wireless access points is/are configured to:

determine when the current location of the first one of the plurality of mobile devices is outside of the secure area and within a predetermined proximity to the door;

determine when the particular user of the first one of the plurality of mobile devices has access rights to gain access through the door;

electrically unlock the door when the current location of the first one of the plurality of the mobile devices is within the predetermined proximity to the door and the particular user that is associated with the first one of the plurality of mobile devices has access rights to gain access through the door;

determine that the particular user of the second one of the plurality of mobile devices does not have access rights to gain access through the door;

determine that the particular user of the second one of the plurality of mobile devices has improperly gained access through the door as a tailgater when the current location of the second one of the plurality of mobile devices is found to be within the secure area; and issue the tailgater alarm when the particular user of the second one of the plurality of mobile devices is determined to have improperly gained access through the door as a tailgater.

11. A method of controlling access through a door of a facility having a door lock that can be electrically locked and unlocked to control access to a secure area, the method comprising:

establishing a wireless communication between one or more wireless access points and a mobile device, wherein the mobile device is associated with a user;

hashing, by the mobile device, an International Mobile Equipment Identity (IMEI) number of the mobile device with a sim card serial number of the mobile device to form an IMEI-based identifier for the mobile device;

one or more of the wireless access points wirelessly receiving from the mobile device an IMEI-based identifier that is unique to the mobile device and operates as a user credential for the user that is associated with the mobile device;

one or more of the wireless access points wirelessly identifying a current location of mobile device;

determining when the current location of the mobile device is within a predetermined proximity to the door;

determining when the user associated with the mobile that has the received IMEI-based identifier has access rights to gain access through the door;

electrically unlocking the door when the current location of the mobile device is within the predetermined proximity to the door and the user associated with the mobile device that has the received IMEI-based identifier has access rights to gain access through the door;

monitoring how many people pass through the door while the door was electrically unlocked to allow the user associated with the mobile device that has the received IMEI-based identifier access through the door; and issuing a tailgater alarm when more than one person passed through the door while the door was electrically unlocked to allow the user associated with the mobile device that has the received IMEI-based identifier access through the door.

12. The method of claim 11, wherein monitoring how many people pass through the door while the door was electrically unlocked to allow the user associated with the mobile device that has the received IMEI-based identifier access through the door comprises:

monitoring an output of an ultrasonic sensor with a field of view that includes a region where people passing through the door must pass; and based on the output of the ultrasonic sensor, count how many individual people passed through the door while the door was electrically unlocked to allow the user associated with the mobile device that has the received IMEI-based identifier access through the door.

13. The method of claim 11, wherein monitoring how many people pass through the door while the door was electrically unlocked to allow the user associated with the mobile device that has the received IMEI-based identifier access through the door comprises:

capturing a video stream of a region where people passing through the door must pass; and processing the video stream with video analytics to count how many individual people passed through the door while the door was electrically unlocked to allow the user associated with the mobile device that has the received IMEI-based identifier access through the door.

14. The method of claim 11, wherein monitoring how many people pass through the door while the door was electrically unlocked to allow the user associated with the mobile device that has the received IMEI-based identifier access through the door comprises:

monitoring an output of a radar based sensor with a field of view that includes a region where people passing through the door must pass;

based on the output of the radar based sensor, count how many individual people passed through the door while the door was electrically unlocked to allow the user associated with the mobile device that has the received IMEI-based identifier access through the door; and wherein the radar based sensor includes one or more transceivers, and a controller for processing incoming signals received as a result of electromagnetic radiation emitted from the one or more transceivers being reflected back to the one or more transceivers.

15. The method of claim 11, wherein each of the one or more wireless access points include a 5G millimeter-wave access point, and wherein the wireless communication between the one or more wireless access points and the mobile device includes sending and receiving one or more 5G millimeter-wave signals.

16. The method of claim 11, wherein each of the one or more wireless access points include an Ultra-Wide Band (UWB) access point, and wherein the wireless communication between the one or more wireless access points and the mobile device includes sending and receiving one or more Ultra-Wide Band (UWB) signals.

17. A method of controlling access through a door of a facility having a door lock that can be electrically locked and unlocked to control access to a secure area, the method comprising:

establishing a wireless communication between one or more wireless access points and a mobile device, wherein the mobile device is associated with a user;

hashing, by the mobile device, an International Mobile Equipment Identity (IMEI) number of the mobile device with a sim card serial number of the mobile device to form an IMEI-based identifier for the mobile device;

one or more of the wireless access points wirelessly receiving from the mobile device an IMEI-based identifier that is unique to the mobile device and operates as a user credential for the user that is associated with the mobile device;

one or more of the wireless access points identifying a current location of mobile device;

determining when the current location of the mobile device is outside of the secure area and within a predetermined proximity to the door;

determining when the user associated with the mobile device that has the received IMEI-based identifier has access rights to gain access through the door;

electrically unlocking the door when the current location of the mobile device is within the predetermined proximity to the door and the user associated with the mobile device that has the received IMEI-based identifier has access rights to gain access through the door;

determining when the current location of the mobile device is found to be within the secure area without the door first being electrically unlocked to allow the user of the mobile device to gain access through the door; and issuing a tailgater alarm when the current location of the mobile device is found to be within the secure area without the door first being electrically unlocked to allow the user of the mobile device to gain access through the door.

18. The method of claim 17, further comprising:

determining when the current location of the mobile device remains within the secure area for a time period that is longer than a threshold time period; and when the current location of the mobile device remains within the secure area for a time period that is longer than a threshold time period, issuing an overstay alarm.

19. The method of claim 17, further comprising:

storing the current location of the mobile device over time;

identifying a normal access pattern of the user associated with the mobile device in accessing to the secure area;

determining when the mobile device is found to be within the secure area in a manner that is outside of the normal access pattern of the user associated with the mobile device; and when the mobile device is found to be within the secure area in a manner that is outside of the normal access pattern of the user associated with the mobile device, issue alert.

* * * * *